(12) United States Patent
Cetiner et al.

(10) Patent No.: US 11,815,376 B2
(45) Date of Patent: Nov. 14, 2023

(54) METHOD AND SYSTEM TO MEASURE GAS FLOW

(71) Applicant: UT-Battelle, LLC, Oak Ridge, TN (US)

(72) Inventors: Mustafa S. Cetiner, Knoxville, TN (US); Trevor K. Howard, Knoxville, TN (US); Annalisa Manera, Ann Arbor, MI (US); Victor Petrov, Ann Arbor, MI (US); Jiaxin Mao, Ann Arbor, MI (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 17/349,087

(22) Filed: Jun. 16, 2021

(65) Prior Publication Data

US 2021/0396554 A1 Dec. 23, 2021

Related U.S. Application Data

(60) Provisional application No. 63/042,670, filed on Jun. 23, 2020.

(51) Int. Cl.
*G01F 1/32* (2022.01)
*G01F 1/325* (2022.01)
*G01F 15/04* (2006.01)

(52) U.S. Cl.
CPC .......... *G01F 1/3287* (2022.01); *G01F 1/3218* (2013.01); *G01F 15/043* (2013.01)

(58) Field of Classification Search
CPC .......... G01F 1/32; G01F 1/3209; G01F 1/3218
See application file for complete search history.

(56) References Cited

U.S. PATENT DOCUMENTS

| | | | |
|---|---|---|---|
| 4,862,750 A | 9/1989 | Nice | |
| 7,343,820 B2 * | 3/2008 | Gysling | G01F 1/74 73/861.23 |
| 7,819,022 B2 * | 10/2010 | Hope | G01F 25/10 73/861.52 |
| 2019/0390990 A1 * | 12/2019 | Krywyj | G01F 1/8413 |

* cited by examiner

*Primary Examiner* — Erika J. Villaluna
(74) *Attorney, Agent, or Firm* — Warner Norcross + Judd LLP

(57) ABSTRACT

A system for measuring gas flow generally including a passive acoustic wave generator disposed in a gas flow stream to passively generate an audio signal through vortex shedding, a sound capturing instrument disposed outside the gas stream to produce an electrical signal representative of the acoustic signal, a temperature sensor to obtain temperature measurements indicative of the temperature of the gas flow stream and a control system for determining the gas flow, such as velocity or flow rate, as a function of the acquired acoustic and temperature measurements. The acoustic wave generator includes a corrugated flow channel whose geometric design is so tuned to generate an acoustic emission whose frequency signature varies as a function of the gas flow velocity. The control system may acquires time-domain acoustic data, and process that data to obtain a frequency-domain representation from which gas velocity or gas flow rate can be determined.

16 Claims, 5 Drawing Sheets

METHOD AND SYSTEM TO MEASURE GAS FLOW

STATEMENT REGARDING FEDERALLY SPONSORED RESEARCH

This invention was made with government support under Contract No. DE-AC05-00OR22725 awarded by the U.S. Department of Energy. The government has certain rights in the invention.

FIELD OF THE INVENTION

The present invention relates to the measurement of gas flow, and more particularly to systems and methods for measuring gas flow velocities and/or gas flow rates suitable in harsh environments in various process facilities, such as chemical reactors, petrochemical plants and nuclear reactors.

BACKGROUND OF THE INVENTION

Gas flow measurement is a mature art. There are various types of flowmeters that measure gas flow rates using different principles of operation. For example, conventional applications often incorporate mechanical flowmeters, pressure-based flowmeters, vortex flowmeters, ultrasonic flowmeters, optical flowmeters and magnetic flowmeters.

A vortex flowmeter uses the principle of bluff-body vortex shedding, also known as the von Karman effect, to produce oscillations on the meter that are measured in terms of the frequency (w) through strain (E). In use, a bluff-body and a strain sensor (such as a piezoelectric crystal) are disposed in the fluid flow path. As fluid passes over the bluff-body, vortex shedding occurs within the fluid, which causes pressure fluctuations within the fluid. The frequency of these pressure fluctuations are measured using a strain senor, and the flow rate is determined as a function of the calculated frequency. A vortex flowmeter may not be well-suited for adoption in applications where access to a conventional flow channel geometry is limited or not possible at all. Moreover, use of these flowmeters may not be acceptable due to direct exposure of the strain gauge to potentially harsh chemical fluids, or in the case of a nuclear reactor, accelerated rate of microstructural damage in the strain gauge due to neutron flux and/or gamma fields.

An ultrasonic, or occasionally (acoustic) based flowmeter relies on launching an acoustic wave which then propagates through the medium and received at some distance away. This device uses transit time to determine velocity of the fluid, which in turn is used to determine flow rate. For example, a device configured to actively generate an acoustic signal is disposed in the fluid flow path to generate a pressure wave of known waveform that travels with the fluid through the flow path. At a distant location, the actively generated sound is received and the time it took for the sound to travel from the point of generation to the point of reception is determined. As with the vortex flowmeter, ultrasonic flowmeters may not be well-suited for applications where access to the flow channel is limited or not possible at all. Additionally, the disposition of ultrasonic sensors, e.g., piezoelectric, magnetostrictive or electromagnetic acoustic transducers (EMATs), directly mounted on the channel walls may not be desirable due to environmental issues, such as harsh chemical fluids in chemical reactors or high radiological fields in nuclear reactors. It may be possible to move the sensors away from direct exposure by disposition of stand-off waveguides, however, they may reduce the signal-to-noise ratio thereby reducing the instrument's accuracy and/or sensitivity.

Despite the extensive variety in gas flow measurement systems (including the vortex flowmeter and the acoustic flowmeter discussed above), there are currently no methods and systems available for direct measurement of flow rate in applications that involve flow of high-velocity, high-temperature gas, and particularly those that involve harsh environments. The key impediments in using commercial-off-the-shelf gas flow measurement methods in gas flow paths of these applications are (1) high flow velocities (10-15 m/s at the nominal operating conditions), (2) high operating temperatures (>700° C.), and (3) either harsh chemical environments or high neutron flux and gamma field. Instead of direct measurement, gas flow rate is typically calculated indirectly using the coolant circulator shaft speed signal, the circulator performance curves and the equation of state of the working fluid. However, this indirect prediction inevitably leads to increased uncertainty in the quantity of interest as circulator performance curves include highly non-linear dynamics—particularly at low-power/low-flow-rate conditions.

As a result, there is a long-felt and unmet need for improved systems and methods for measuring gas flow, including systems and methods suitable for use in harsh environments.

SUMMARY OF THE INVENTION

The present invention provides a system for measuring flow velocity in a gas flow stream generally including a passive acoustic wave generator disposed in the gas flow stream to generate an audio signal through the vortex-shedding phenomenon, an instrument to measure the far-field pressure field, i.e., sound, disposed outside the gas stream to produce an electrical signal representative of the passively generated acoustic signal, a temperature sensor to obtain temperature measurements indicative of the temperature of the gas flow stream and a data acquisition and signal processing system for determining the gas flow, such as velocity or flow rate, as a function of the captured acoustic signal and temperature measurements.

In one embodiment, the acoustic wave generator includes a corrugated flow channel whose geometric design is so tuned to generate an acoustic emission whose frequency varies as a function of the gas flow velocity. For example, the acoustic wave generator may be a tubular flow channel (or an insert for a tubular flow channel) with inwardly-facing corrugations that interact with the gas stream and cause vortex shedding. In one embodiment, the corrugations include alternating channels and ridges that are configured to generate a series of tones for a given gas velocity range. These tones are further modulated by the specific shape of the corrugations to generate acoustic tones that can be directly correlated with the gas velocity.

In one embodiment, the corrugations include a plurality of alternating channels and ridges that extend generally perpendicularly to the direction of the gas flow. In one embodiment, the corrugations are regularly spaced and extend parallel to one another along a portion of the gas flow path. In one embodiment, the channels and ridges are uniform in size and shape and arranged in a regular repeating pattern. In one embodiment, the channels and ridges are generally rectilinear in cross section. The characteristic of the channels and ridges are tuned to provide acoustic emissions with discernable variations over the desired range of gas velocities. For example, the number, size, shape, spacing, orientation, cross-sectional shape, height/depth, length and other physical attributes of the corrugations may be varied to tune the characteristic acoustic-emission response function of the acoustic wave generator.

In one embodiment, the acoustic wave generator may include a plurality of corrugated flow channels arranged in series along the gas flow path. The acoustic emissions generated by the plurality of corrugated flow channels can be captured and processed individually or in concert to improve the resolution and accuracy of the gas flow measurement.

In one embodiment, the acoustic emissions are captured by a sound capturing instrument, such as a microphone, positioned outside the gas flow path. In one embodiment, the acoustic emissions are picked up by a microphone positioned outside the process environment. For example, when measuring gas flow in coolant flow path, the microphone may be positioned on the outside surface of the coolant duct, where it is not subjected to the gas flow. As another example, when measuring gas flow within a pressure vessel, reactor vessel or other processing unit, the microphone may be located outside the outer surface of the pressure vessel, reactor vessel or other processing unit. Alternatively, when incorporated into a reactor pressure vessel for an HTGR, the microphone(s) may be placed in a shielded box in the reactor vessel head with an opening for acoustic transmission that provides adequate protection from direct radiation shine from the reactor core.

In one embodiment, the gas flow rate measuring system includes a temperature sensor configured to produce a temperature signal representative of the temperature of the gas. The temperature sensor may, for example, be a thermocouple disposed in the gas flow path. In one embodiment, the thermocouple is located within, adjacent or near the acoustic wave generator. In some applications, the system may include a plurality of temperature sensors, such as a separate thermocouple located at or near each end of the acoustic wave generator. When a plurality of temperature sensors are included, the system may utilize an average or other combination of temperature measurements.

In one embodiment, the present invention includes a data acquisition and signal processing system configured to acquire acoustic and temperature data and to process the data to determine the gas flow rate. In one embodiment, this data acquisition and signal processing system includes a data acquisition section configured to obtain data samples from the acoustic sensor (e.g. microphones) and the temperature sensor (e.g. thermocouple).

In one embodiment, the data acquisition system samples the microphone periodically, for example, at a sampling rate in the range of 0.2 kHz to 20 kHz, to compile data representative of the acoustic emissions of the acoustic wave generator. In one embodiment, the data acquisition system also periodically samples the thermocouple to obtain data representative of the temperature of the gas in the gas flow path.

In one embodiment, the data acquisition and signal processing system is configured to mathematically transform the captured audio signal from the time domain to the frequency domain. For example, the data acquisition and signal processing system may be configured to perform a fast Fourier transform (FFT) on the captured audio signal.

In one embodiment, the data acquisition and signal processing system is configured to divide the captured audio signal into time segments and then convert the audio signal over each time segment into a frequency domain representation for that time segment. For example, the data acquisition and signal processing system may be programmed to repeatedly perform FFT analyses on successive time segment of the audio signal to generate frequency-domain representation of the audio signal over that time segment.

In one embodiment, the data acquisition and signal processing system is configured to determine the gas flow velocity for a given time segment as a function of the frequency-domain representation of the audio signal for that time segment and the temperature measurement for that time segment.

In one embodiment, the data acquisition and signal processing system (DASP) is configured to determine the gas flow rate as function of the determined velocity and the cross-sectional area of the gas flow path within the acoustic wave generator.

In another aspect, the present invention provides a method for measuring gas flow rates, including the steps of: (a) introducing a passive acoustic wave generator into a gas flow path, (b) capturing acoustic emissions produced passively by the acoustic generator in response to interaction between the flowing gas and the acoustic wave generator, (c) capturing the temperature of the gas, (d) determining the velocity of the gas as a function of the captured acoustic emissions and the captured temperature and (e) optionally determining the gas flow rate as a function of the determined velocity and the cross sectional area of the gas flow path.

In one embodiment, the acoustic wave generator is a tubular flow channel with internal corrugations that cause vortex shedding within the gas as it moves through the tubular flow channel. The method may include the step of configuring the tubular flow channel and corrugations to provide varying acoustic emissions over a range of gas flow velocities.

In one embodiment, the step of acquisition of acoustic emissions includes capturing sound by a microphone or other sound capturing device disposed outside the gas flow path.

In one embodiment, the step of capturing the temperature of the gas includes placing a thermocouple or other temperature sensor in the gas flow path at or near the acoustic wave generator and periodically obtaining temperature measurements.

In one embodiment, the step of determining the gas flow velocity or gas flow rate includes the steps of converting the captured time-domain acoustic data into frequency-domain data. This conversion may include the step of performing an FFT on time-based acoustic data.

The present invention provides an effective and reliable gas flow rate meter that is well-suited for use in harsh environments. The present invention provides a non-invasive means to measure gas flow velocity using acoustic resonance. Specifically, this invention exploits the vortex-shedding phenomenon that is observed when a compressible fluid flows over corrugation in a channel. Shed vortices produce pressure fluctuations which in turn are radiated as acoustic signals in various modes in the flow channel of interest.

While the natural frequency of acoustic emission is predominantly a function of the cavity geometry for a first-order approximation, the acoustic tune generated due to the coupled physics between the vortex shedding and the resulting pressure waves exhibits strong dependence on the velocity of the gas flowing through the corrugated channel. These general trends for rounded geometries have been observed by scientists. Observations of the linear relationship between mode excitation and velocity have been observed, and a potential relationship between velocity and the frequency of the given mode has been demonstrated. Such a relationship is highly dependent upon the geometry.

Another advantage of the disclosed method and system is that it does not require major modifications to internals of processing equipment. The acoustic wave generator is a passive device that produces acoustic emission based on interactions between the gas and the geometry of the acoustic wave generator. As a result, the acoustic emissions are generated without the need for electronics or moving mechanical parts within the gas flow stream. The actual sensing of the acoustic emissions can be accomplished without interfering with the flow, and potentially on the outside surface of the processing equipment.

These and other features of the invention will be more fully understood and appreciated by reference to the description of the embodiments and the drawings.

Figure 1:
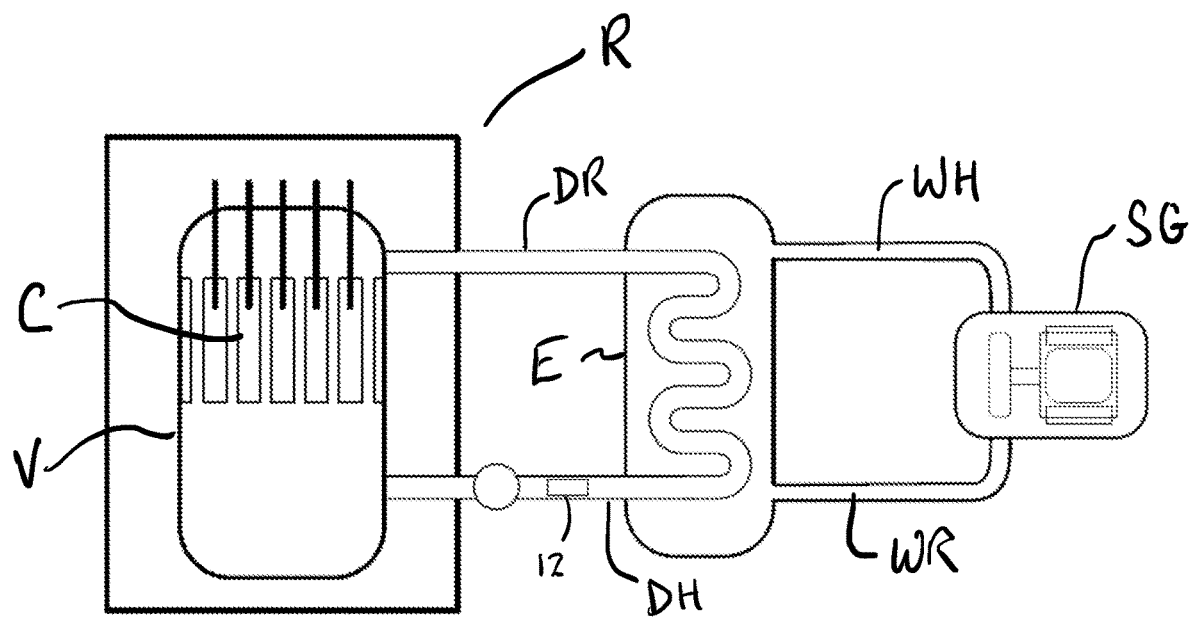
FIG. 1 is a representative view of a high-temperature gas-cooled reactor incorporating a gas flow measurement system in accordance with an embodiment of the present invention.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF CURRENT EMBODIMENTS

Overview

Figure 2:
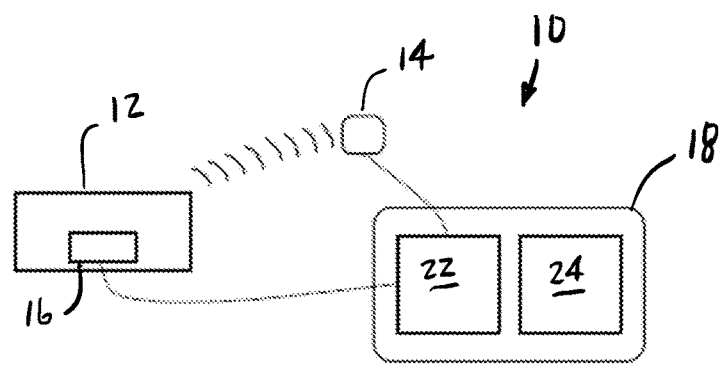
FIG. 2 is a schematic representation of the gas flow measurement system.

The present invention relates to measuring gas flow velocities and/or gas flow rates in harsh environments and may be incorporated into a wide range of processing facilities, such as chemical reactors, petrochemical plants and nuclear reactors. For purposes of disclosure and not by way of limitation, the present invention is described in the context of a high-temperature gas-cooled reactor. A high-temperature gas-cooled reactor R incorporating an acoustic wave generator of a gas flow measurement system in accordance with an embodiment of the present invention is shown in FIG. 1. As shown in FIG. 2, the gas flow measurement system 10 generally includes a passive acoustic wave generator 12, an acoustic emission sensor 14, a temperature sensor 16 and a data acquisition and signal processing system system 18 capable of determining gas flow rate from the acoustic emissions and temperature data. In the illustrated embodiment, the passive acoustic wave generator 12 is disposed in a coolant gas flow path and includes corrugations 32 over which the gas will flow. The corrugations 32 are tuned so that the acoustic wave generator 12 produces an acoustic emission that varies with the velocity of the gas flowing through the gas flow path G. In this embodiment, the acoustic emission sensor 14 includes one or more microphones that are disposed outside the gas flow path P and in a position where they can pick up the acoustic emissions generated by the acoustic wave generator 12. The data acquisition and signal processing system system 18 includes a data acquisition section 22 that acquires temperature and acoustic data and a signal processor section 24 that is configured to convert individual time segments from the captured audio signal into a frequency domain, to determine the gas flow velocity as a function of the adjusted frequency domain data and temperature data and to determine the gas flow rate as a function of the determined velocity and the cross sectional area of the gas flow path.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

Gas Flow Measurement System

As described above, the present invention relates to measuring gas flow velocities and/or gas flow rates in harsh environments and may be incorporated into a wide range of processing facilities, such as chemical reactors, petrochemical plants and nuclear reactors. By way of example, a gas flow measurement system 10 in accordance with one embodiment of the present invention is described in the context of a nuclear reactor and, more specifically, a high-temperature gas-cooled reactor ("HTGR"). Although described in the context of a high-temperature gas-cooled reactor, the present invention may be incorporated into other applications. For example, the present invention may be used in essentially any process industry where gas flow measurement is a challenge due to increased temperatures, high flow rates and/or other harsh conditions, such as chemical reactors and petrochemical plants. The present invention is not, however, limited for use in harsh environments, but may be used elsewhere as desired. Further, although the present invention is described in the context of measuring a gas flow rate, the present invention (the disclosed configuration of corrugations) may be used to measure the velocity or flow rate of essentially any fluid capable of generating acoustic emissions that vary with velocity.

Referring now to FIG. 1, the illustrated reactor R includes a reactor core C housed within a reactor pressure vessel V. Coolant flow paths P are formed around the reactor core C to allow the circulation of a coolant, such as helium gas. The coolant extracts heat from the reactor core C and conveys it to a heat exchanger E located remotely from the reactor core C. In this embodiment, the coolant flows from the reactor core C to the heat exchanger E along hot gas duct DH and returns to the reactor core C along return gas duct DR. The coolant may be motivated by a circulator or pump. At the heat exchanger E, heat is transferred from the coolant to another heat transfer medium, such as water, so that it can eventually be used as a direct or indirect energy source. For example, in the illustrated embodiment, the heat produced within the reactor core C is used to drive a steam generator SG. In this context, the heat transfer medium is water, which is circulated through the steam generator SG via hot water duct WH and water return duct WR. In operation, the water is converted to steam within the heat exchanger E and the steam is used to power the steam generator SG. After passing through the steam generator SG, the water is returned to the liquid state and then routed back to the heat exchanger E.

Figure 5:
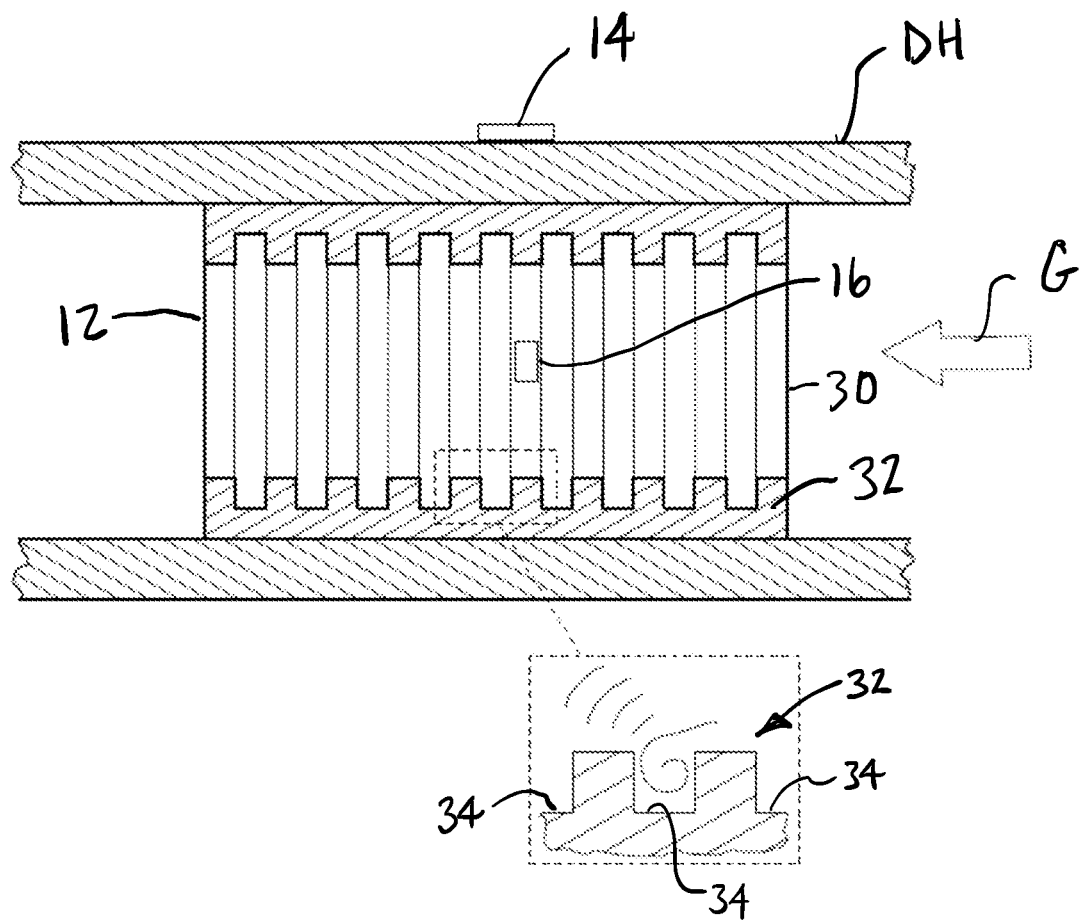
FIG. 5 is a sectional view of an acoustic wave generator in a gas flow path.
Figure 7:
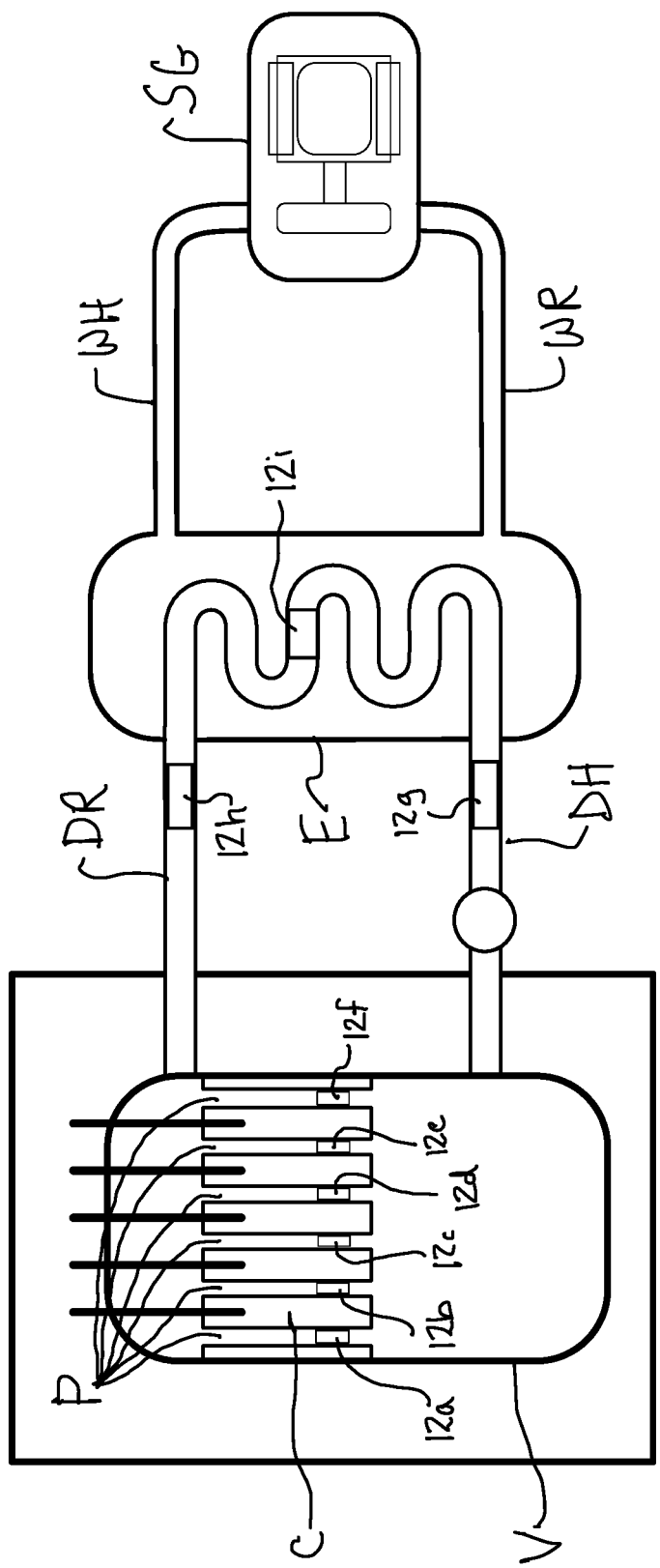
FIG. 7 is a representative view of a high-temperature gas-cooled reactor incorporating a gas flow measurement system in accordance with an alternative embodiment of the present invention.

In the illustrated embodiment, the gas flow measurement system 10 is configured to measure the gas flow rate in the hot gas duct DH. As shown in FIG. 5, the gas flow measurement system 10 generally includes a passive acoustic wave generator 12 disposed in the hot gas duct DH, an acoustic emission sensor 14 (such as a microphone) situated outside the hot gas duct DH, a temperature sensor 16 positioned within the acoustic wave generator 12 and a control system 18 configured to determine the gas flow rate in the hot gas duct DH from the acoustic emissions generated by the acoustic wave generator 12 and the temperature data produced by the temperature sensor 16, as described in more detail below. Although the gas flow measurement system 10 of the illustrated embodiment includes an acoustic wave generator 12 disposed in the hot duct DH transporting hot coolant gas G to the heat exchanger E, the acoustic wave generator 12 may be disposed in other locations along the coolant flow path, such as in the return duct DR transporting coolant back to the reactor R or within the reactor pressure vessel V. For example, in alternative embodiments, the gas flow measurement system may be configured to measure gas flow rates in the headspace above the nuclear core C or in one or more coolant flow passages that extend around the core C. More specifically, in the reactor core of a typical HGTR, a plurality of coolant flow passage P are arranged around the exterior of the core C within the pressure vessel V. In this context, a separate acoustic wave generator 12a-f may be disposed in each flow passage P and the acoustic emissions from each acoustic wave generator 12a-f can be considered to develop an understanding of the detailed profile of the coolant gas flow through the network of coolant flow passages within the core C (See FIG. 7). The detailed profile may help to determine the flow rate in each flow passage P and when clogs, obstructions or other issues occur within a specific flow path. By way of example, FIG. 7 also shows additional acoustic wave generators 12g-i in hot duct DH, return duct DR and within heat exchanger E, one or more of which may be incorporated to provide flow rate information in other locations along the coolant flow path.

In applications that include a plurality of acoustic wave generators, each acoustic wave generator may be configured differently (e.g. different tubular flow channel characteristics and/or different corrugation characteristics) to provide that acoustic wave generator with a unique acoustic emission signature. To capture the acoustic emissions, a single microphone may suffice. However, in some applications, it may be desirable to have a plurality of microphones. This may be desirable when not all of the acoustic emissions are loud enough to be captured by a single microphone at a single location, or when the frequency signature of different acoustic wave generators is substantially different and it is desirable to have each microphone tuned to the frequency signature of a different acoustic wave generator. Further, a plurality of microphones may be useful in discriminating between the acoustic emissions of different acoustic wave generators through triangulation based on the relative loudness of the captured acoustic emissions at the different microphones.

In the illustrated embodiment, the acoustic wave generator 12 includes a corrugated flow channel having a geometry tuned to passively generate an acoustic emission with a frequency signature that varies as a function of the gas flow velocity. Generally speaking, the acoustic wave generator 12 exploits the vortex shedding phenomenon that is observed when a compressible fluid flows over corrugation in a channel. Shed vortices produce pressure fluctuations which in turn are radiated as acoustic signals in various modes in the flow channel of interest. The vortex shedding and acoustic signals are shown representatively in the enlarged portion of FIG. 5. In fact, the combination of the passive acoustic wave generator 12, and the acoustic emission sensor 14 is sometimes referred to as an acoustic-vortex flowmeter. While the natural frequency of acoustic emission is predominantly a function of the cavity geometry for a first-order approximation, the acoustic tune generated due to the coupled physics between the vortex shedding and the resulting pressure waves exhibits strong dependence on the velocity of the gas flowing through the corrugated channel. Accordingly, the acoustic wave generator 12 may incorporate essentially any geometry capable of generating acoustic emissions that vary with velocity of the gas passing through or over the acoustic wave generator 12. In typical embodiments, the acoustic emissions will be in the range of 200 to 20000 Hz, but the frequency range of the acoustic emissions may vary from application to application.

Prediction of the frequency (f) of the acoustic wave generator is predicted from the Strouhal number (St=fb/U) where b is the corrugation size and U, the mean gas velocity. Corrugation size is approximately the cavity space between corrugations. The characteristic curve of the device is generally linear, but is influenced by the resonance of the tube. Tube resonant frequencies ($f_n$=nc/2L) are estimated based on the resonance integer (n), tube length (L), and speed of sound in the gas (c). The speed of sound is a temperature dependent property. Coupled computational fluid dynamic and acoustic emission simulations provide a more detailed prediction of the radiated frequencies.

Calibration of the acoustic wave generator is achieved by flow testing the device and producing a relationship between the mean gas flow rate and the frequency produced. In applications where the initial resonance frequency ($f_n$) is large, a temperature correlation may be needed to correct for shifts due to the speed of sound. If ($f_n$) is small temperature correction may not be needed.

Figure 3:
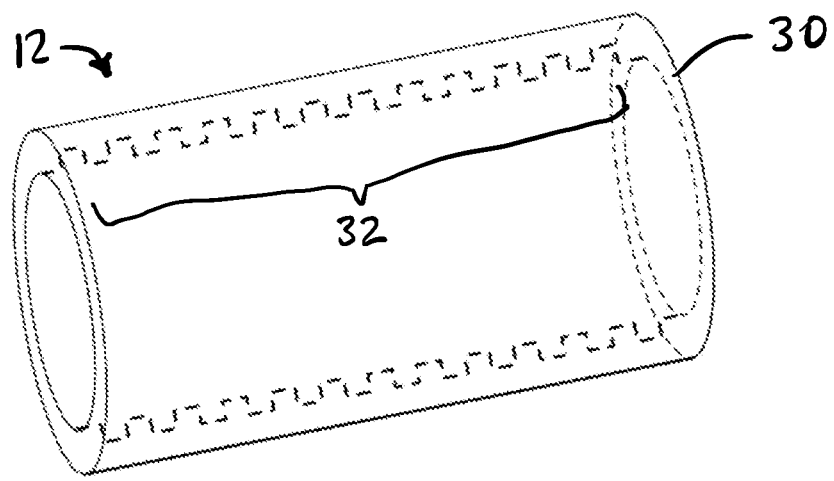
FIG. 3 is a perspective view of the acoustic wave generator.
Figure 4:
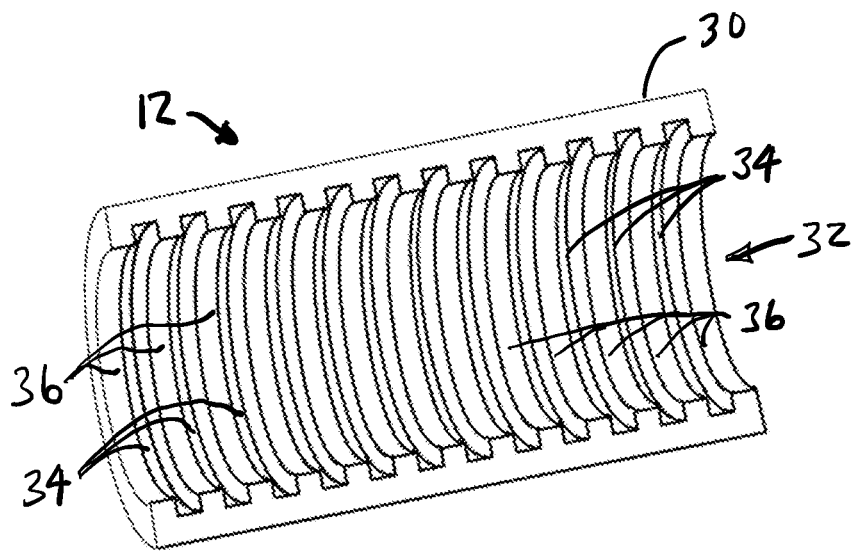
FIG. 4 is a sectional perspective view of the acoustic wave generator.

As shown in FIGS. 3-5, the acoustic wave generator 12 of the illustrated embodiment is a tubular flow channel 30 with inwardly-facing corrugations 32 that interact with the gas stream to cause vortex shedding within the gas. In this embodiment, the corrugations 32 extend annularly around the interior surface of the tubular flow channel 30, and are configured to generate a series of tones for a given gas velocity range (e.g. the expected velocity range for that particular application). These tones are further modulated by the specific shape of the corrugations 32 to generate acoustic tones that are dependent upon the gas velocity.

Referring now to FIGS. 4 and 5, the corrugations 32 include a plurality of alternating channels 34 and ridges 36 formed in the interior surface of the tubular flow channel 30. The channels that extend laterally perpendicular to the central axis of the tubular flow channel 30 and the direction of the gas flow. In this embodiment, the corrugations 32 are regularly spaced and extend parallel to one another along the entire interior surface of the tubular flow channel 30. As perhaps best shown in FIGS. 4 and 5, the channels 34 and ridges 36 are uniform in size and shape, and are generally rectilinear in cross section. The characteristic of the tubular flow channel 30 and the corrugations 32, including the channels 34 and ridges 36, are tuned to provide acoustic emissions with discernable variations over the desired range of gas velocities. For example, the internal diameter and length of the tubular flow channel, as well as the number, size, shape, spacing, orientation, cross-sectional shape, channel depth, ridge height and other physical attributes of the corrugations may be varied to tune the acoustic emissions of the acoustic wave generator 12. As used herein, the term "corrugations" is used broadly to refer to any form of ribs, ridges, grooves, channels, contours or variations capable of causing vortex shedding otherwise contributing to the acoustic signature of the gas flow.

In the illustrated embodiment, the acoustic wave generator 12 includes a single tubular flow channel 30 with internal corrugations 32. In alternative applications, the acoustic wave generator may include a plurality of corrugated tubular flow channels arranged in series along the gas flow path. In applications that include a plurality of tubular flow channels, the acoustic emissions generated by the plurality of corrugated flow channels can be considered individually or in concert to improve the resolution and accuracy of the flow rate measurement.

As noted above, the acoustic emissions produced by the acoustic wave generator 12 are captured by an acoustic emission sensor 14. In the illustrated embodiment, the acoustic emission sensor 14 is a microphone positioned on the outside surface of the hot gas duct DH. In this location, the microphone 14 is not subjected to the harsh environment within the hot gas duct DH. The illustrated location of the microphone 14 is merely exemplary. The microphone 14 may be positioned in essentially any location where it can withstand the environment and adequately capture the acoustic emissions from the acoustic wave generator 12. In some applications, more than a single microphone may be used as described in more detail elsewhere.

The location of the microphone or microphones may vary from application to application. For instance, when measuring gas flow rates within the reactor core, the microphone may be located outside the outer surface of the reactor pressure vessel V proximate the acoustic wave generator. Alternatively, the microphone(s) may be placed in a shielded box in the reactor vessel head with an opening for acoustic transmission that provides adequate protection from direct radiation shine from the reactor core.

As noted above, the gas flow measurement system 10 of the illustrated embodiment is designed to take temperature variations into consideration when determining gas flow rates. Given that the speed of sound in a gas varies with the temperature of the gas, the acoustic emission signature of the acoustic wave generator 12 may vary for a given gas depending on the temperature of that gas. To accommodate for this variation, the system 10 may incorporate a temperature sensor configured to provide temperature data for the gas. In the illustrated embodiment, the temperature sensor 16 includes a thermocouple disposed within the acoustic wave generator 12. For example, as shown in FIG. 5, a thermocouple 16 is disposed toward the center of the tubular flow channel 30 to provide temperature measurements of the gas, though the position of the thermocouple 16 may vary from application to application. If desired, the temperature sensor may include a plurality of temperature sensors. For example, in an alternative embodiment, a first thermocouple may be positioned at or near the entry to the tubular flow channel and a second thermocouple may be positioned at or near the exit to the tubular flow channel. The measurements from the two thermocouples may be average or otherwise combined in determining gas flow velocity. Although the temperature sensor of the illustrated embodiment is a thermocouple, the temperature sensor may be essentially any type of sensor capable of withstanding the environment and taking temperature measurements in the applicable temperature range. For example, the temperature sensor in alternative embodiments may be essentially any resistance temperature detector, thermistor or infrared temperature sensor.

The gas flow measurement system 10 includes a data acquisition and signal processing system system 18 for acquiring data, processing the data and determining the gas flow rate. In the illustrated embodiment, the control system 18 includes a data acquisition section 22 that acquires temperature and acoustic data and a processor section 24 that processes the acquired data to determine the gas flow rate as a function of the acquired data.

In the illustrated embodiment, the data acquisition section 22 is configured to sample the microphone 14 at a desired sampling rate, for example, in the range of 0.2 kHz to 20 kHz. This sampling rate range is merely exemplary and the sampling rate may be outside this range in some applications. The acoustic wave generator 12 may be configured to produce acoustic emissions in a specific frequency range (audible or inaudible), and the microphone 14 may be selected to pick up acoustic emissions in the desired frequency range. In applications that incorporate more than one microphone, each microphone may be separately sampled and the data may be separately stored. Similarly, the data acquisition section 22 is configured to periodically obtain measurements from the thermocouple 16. For example, data acquisition section 22 may obtain temperature data every 0.5-5 seconds. In typical applications, the acoustic data and the temperature data is processed in sequential time segments (as discussed below), and one or more temperature measurements are captured during each time segment. If the system 10 includes two temperature sensors 16, the data from each sensor may be separately sampled and stored. The acoustic and temperature data is stored for use by the processor section 24. In the illustrated embodiment, the microphone 14 and the thermocouple 16 output analog signals representative of the acoustic emissions and the gas temperature. In this embodiment, the data acquisition section 22 includes analog inputs for the microphone 14 and the thermocouple 16, and analog-to-digital converter(s) for converting the analog signals into digital data that is stored in memory (e.g. in a data file) for use by the signal processor section 24.

In the illustrated embodiment, the signal processor section 24 is configured to determine gas flow velocity and/or gas flow rate over discrete sequential time segments. The length of the time segments may vary from application to application, for example, from 0.001 seconds to 10 seconds. The length of the time segment may, in some applications, vary with the frequency, such as roughly 20/f. In one implementation, the signal processor section 24 is configured to process the captured acoustic data and temperature data in individual corresponding time segments by converting a portion of the stored time-domain acoustic data into a frequency-domain representation and then determining the gas flow velocity or gas flow rate as a function of the frequency-domain data and temperature data for that time segment. In the illustrated embodiment, the time-domain acoustic data is mathematically converted to a frequency-domain representation, for example, using a fast Fourier transform ("FFT") or other suitable algorithm. Essentially any data from the frequency-domain representation may be used as a signature from which to determine the gas flow velocity or gas flow rate, including the presence, absence or other characteristics of peaks at selected frequencies. For example, the presence of select frequency peaks, the presence of a combination of select frequency peaks, the magnitude of select frequency peaks, the spacing between the peaks of the greatest magnitude can be considered in developing an acoustic signature for the current time segment.

In one implementation of the present invention, calibration data for the acoustic wave generator 12 is collected in advance to build data tables that allow the gas flow velocity to be determined from the collected acoustic and temperature data. For example, during a pre-use calibration process, gas is passed through the acoustic wave generator at various temperatures and various velocities, and the acoustic emissions are measured at each known tested temperature and velocity combination to determine the acoustic signal at the tested temperatures and velocities. In some implementations, the calibration process may be configured to build a separate table for each temperature (or range of temperatures) that includes acoustic emission data for each tested velocity (or range of velocities).

During use, the processor section 24 may utilize the temperature and acoustic emission data to determine the gas flow velocity or gas flow rate from the tables developed during the calibration process. For example, in operation, the processor section 24 may obtain the temperature data for the corresponding time segment. This may be a single temperature measurement or a combination of temperature measurements, such as an average, taken by one or more temperature sensors over the applicable time segment. The processor section 24 may also process the time-domain acoustic data for that time segment to obtain a frequency-domain representation of the acoustic emissions over that period. The processor section 24 may than compare select features of the frequency-domain representation with the acoustic features stored in the calibration table for the corresponding temperature (or temperature range) to determine the gas flow velocity. It should be recognized that calibration tables are only one method for determining gas flow velocity. In other applications, equations or other mathematical models may be implemented for converting the acoustic emissions and temperature into a gas flow velocity or gas flow rate. It should also be noted that in some application where temperature fluctuations are sufficiently small or the changes in resonant frequencies are small, the present invention may be implemented without reliance on temperature data. In such applications, the temperature sensor(s) may be eliminated and the determination may be based solely on the acoustic signature of the acoustic wave generator.

Given that velocity and flow rate are related, it should be understood that the present invention may be used to determine gas flow velocity or gas flow rate, as desired in each specific application. In typical applications, the cross-sectional area of the acoustic wave generator is fixed, and the velocity and flow rate are directly proportional. As a result, calibration may involve testing the acoustic wave generator at different flow velocities and temperatures to produce a set of flow velocity tables or at different flow rates and temperatures to produce a set of flow rate tables. In operation, flow velocity tables can be used to arrive at the flow velocity associated with a given acoustic signature or flow rate tables can be used to arrive at the flow rate associated with a given acoustic signature. In applications that involve determination of a flow velocity, the flow velocity and cross-sectional area of the acoustic wave generator can be used to calculate the associate flow rate.

The present invention also provides a method for measuring gas flow that is suitable for use in harsh environments. The method generally includes the steps of: (a) introducing an acoustic wave generator 12 into a gas flow path; (b) capturing acoustic emissions produced passively by the acoustic wave generator in response to interaction between the flowing gas and the acoustic wave generator; (c) capturing the temperature of the gas, and (d) determining a characteristic of the gas flow as a function of the captured acoustic emissions and the captured temperature. The determined characteristic of the gas flow may be the velocity and/or the flow rate of the gas through the gas flow path. In some applications, the method may include the steps of determining the gas flow velocity as a function of the acoustic emissions and the temperature, and subsequently determining the gas flow rate as a function of the gas flow velocity and the cross-sectional area of the acoustic wave generator.

In the illustrated embodiment, the acoustic wave generator 12 is a tubular flow channel 30 with internal corrugations 32 that cause vortex shedding within the gas as it moves through the tubular flow channel 30. In embodiments of this type, the method may include the step of configuring the tubular flow channel 30 and corrugations 32 to provide varying acoustic emissions over a range of gas flow velocities. For example, in any particular application, the characteristics of the tubular flow channel 30 and corrugations 32 may be selected so that there is acceptable dynamic range in the acoustic emission signature over the anticipated range of flow velocities.

The step of capturing acoustic emissions may include capturing sound by a microphone or other sound capturing device disposed outside the gas flow path. In the illustrated embodiment, the system 10 incorporates a microphone 14 for capturing acoustic emissions. The microphone 14 is disposed on the exterior surface of the hot gas duct DH. In other applications, the microphone 14 or other sensor may be positioned is different locations. The step of capturing acoustic emissions may include the step of capturing data representative of the acoustic emissions at a sampling rate.

In the illustrated embodiment, the step of capturing the temperature of the gas includes placing a thermocouple 16 or other temperature sensor in the gas flow path at or near the acoustic wave generator 12 and periodically obtaining temperature measurements. For example, the step of capturing temperature data may include the step of periodically obtaining data representative of the temperature of the gas from the thermocouple 16.

In the illustrated embodiment, the system 10 includes a control system 18 having a data acquisition section 22 and a signal processor section 24. In such embodiments, the steps of capturing data representative of acoustic emissions and data representative of gas temperature are implemented by the data acquisition section 22.

In the illustrated embodiment, the signal processor section 24 converts the acquired acoustic data to provide a frequency-domain representation of the acoustic data. The steps of converting the acoustic data into frequency-domain data may include the step of performing a fast Fourier Transformation on the captured acoustic data.

Figure 6:
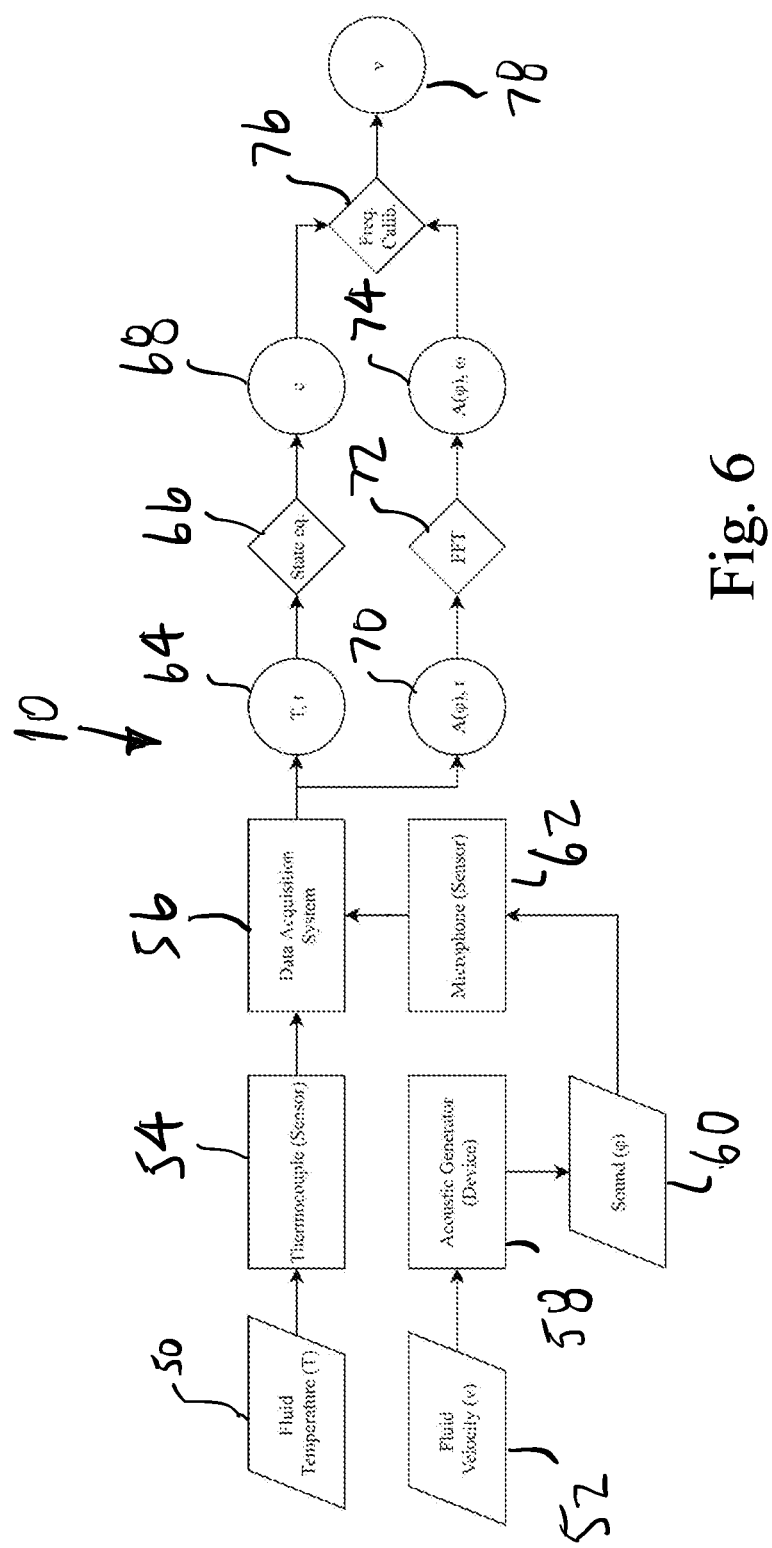
FIG. 6 is a diagram of the gas flow measurement system.

FIG. 6 is a diagrammatic representation of the illustrated gas flow measurement system 10. In this representation, boxes 50 and 52 represent the temperature and velocity characteristic of the gas G to be measured. The temperature of the gas is measured at box 54, for example, by the thermocouple 16. The gas G passes through the acoustic wave generator 12 at box 58. The interaction between the gas and the corrugated acoustic wave generator 12 causes vortex shedding that produces sound (e.g. acoustic emissions) as represented by box 60. The sound is measured at box 62, for example, by microphone 14. The data acquisition system samples the microphone (or other sensor) to acquire time-domain acoustic emission data as shown at box 56. The data acquisition system also periodically samples the thermocouple (or other sensor) to acquire temperature data as also shown at box 56. The data acquisition system may be the data acquisition section 22 of the data acquisition and signal processing system 18 described above.

Time-domain data representative of the acoustic emissions is stored in memory at box 70. The stored acoustic data is converted from a time-domain to a frequency-domain representation at box 72. The conversion is performed, in this embodiment, by performing a fast Fourier Transform on the time-domain data. The resulting time-domain data is stored in memory as shown at box 74.

Data representative of the temperature is stored in memory at box 64. The temperature data is considered against the equation of state information for the gas G as shown at box 66. Given that the speed of sound in a fluid can vary with temperature of the fluid, the comparison is made between the temperature and the equation of state information to arrive at a calibration curve, calibration factor or other calibration mechanism to allow the gas flow measurement system to compensate for temperature variations in the gas G. The calibration curve, calibration factor or other calibration mechanism is stored in memory at box 68.

The gas flow measurement system then determines the gas flow velocity as a function of the frequency-domain representation of the acoustic emissions and the calibration curve (or other calibration mechanism) as shown at box 76. The velocity is then stored in memory as shown at box 78. Although not shown, the gas flow velocity can be used to determine the volumetric gas flow rate by multiplying the gas flow velocity by the cross-sectional area of the flow path in the acoustic wave generator.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. An acoustic-vortex resonance flowmeter comprising:
an acoustic wave generator configured to be disposed in a gas flow path, the acoustic wave generator having a body that includes a tubular flow channel with an internal surface having a plurality of alternating channels and ridges extending annularly around the internal surface in a direction substantially perpendicular to a central axis of the tubular flow channel, wherein the channels and ridges are disposed in a regular repeating pattern along the central axis to passively generate inside the tubular flow channel acoustic emissions in response to the flow of gas through the tubular flow channel, wherein the regular repeating pattern of channels and ridges extends over a length L of the tubular flow channel and has a corrugation size b, wherein the length and the corrugation size are tuned to cause the acoustic emissions to (i) resonate with the tubular flow channel and (ii) have a frequency signature that varies with the velocity of the gas; and
an acoustic sensor positioned external to the gas flow path, near an outer surface of the acoustic wave generator's body, the acoustic sensor configured to generate a signal representative of the generated acoustic emissions.

2. A gas flow measurement system comprising:
the acoustic-vortex resonance flowmeter of claim 1 configured to generate the signal representative of the acoustic emissions; and
a control system configured to acquire time-domain acoustic data representative of the signal generated by the acoustic-vortex resonance flowmeter, to provide a frequency-domain representation of the acquired acoustic data and to determine a characteristic of the gas flow as a function of the frequency-domain representation.

3. The gas flow measurement system of claim 2 wherein the acoustic sensor is a microphone and the control system is configured to acquire data from the microphone at a sampling rate.

4. The gas flow measurement system of claim 3 wherein the control system includes a signal processor section for performing a fast Fourier Transform on the acquired time-domain acoustic data to provide its frequency-domain representation.

5. The gas flow measurement system of claim 4 wherein the signal processor section includes acoustic emission calibration data and a characteristic of gas flow is determined as a function of the frequency-domain representation and the acoustic emission calibration data.

6. The gas flow measurement system of claim 2 further comprising a temperature sensor; and
wherein the control system is configured to acquire data representative of the temperature of the gas, and determine a characteristic of the gas flow as a function of the frequency-domain representation and the temperature data.

7. The gas flow measurement system of claim 6 wherein the temperature sensor is a thermocouple disposed in the gas flow path inside the tubular flow channel of the acoustic wave generator's body.

8. The gas flow measurement system of claim 6 wherein the thermocouple is mounted to the internal surface of the tubular flow channel where it will be in direct contact with the gas flowing through the gas flow path.

9. The gas flow measurement system of claim 6 wherein the signal processor section includes acoustic emission and temperature calibration data, and the signal processor section is configured to determine a characteristic of gas flow as a function of the frequency-domain representation, the temperature data and the acoustic emission and temperature calibration data.

10. The acoustic-vortex resonance flowmeter of claim 1 wherein the channels and the ridges are rectilinear in cross section.

11. A method for measuring the flow of a gas, comprising the steps of:

introducing the acoustic wave generator of the acoustic-vortex resonance flowmeter of claim 1 into a gas flow path;

capturing data representative of the acoustic emissions passively generated inside the tubular flow channel of the acoustic wave generator by the regular repeating pattern of channels and ridges extending annularly around the internal surface of the tubular flow channel of the acoustic wave generator;

converting the captured data representative of acoustic emissions into a frequency-domain representation of the acoustic emissions; and determining a characteristic of the gas flow as a function of the frequency-domain representation of the acoustic emissions.

12. The method of claim 11 further including the steps of:

positioning a temperature sensor within the gas flow path at or near the acoustic wave generator, obtaining, using a temperature sensor, a temperature measurement indicative of a temperature of the gas in the gas flow path; and wherein the step of determining a characteristic of the gas flow is further defined as determining the characteristic of the gas flow as a function of the frequency-domain representation of the acoustic emissions and the temperature of the gas.

13. The method of claim 12 wherein the step of determining a characteristic of the gas flow is further defined as determining the characteristic of the gas flow as a function of the frequency-domain representation of the acoustic emissions and a speed of sound in the gas at the temperature of the gas as determined by a state equation for the gas.

14. The method of claim 11 wherein the step of capturing data representative of the acoustic emissions includes positioning a microphone outside the gas flow path and capturing data representative of the acoustic emission using the microphone.

15. The method of claim 11 wherein the step of converting the captured data representative of acoustic emissions into a frequency-domain representation includes performing a fast Fourier Transform on the capture data representative of acoustic emissions.

16. The method of claim 11 wherein the step of determining a characteristic of the gas flow is further defined as determining the characteristic of the gas flow by comparing the frequency-domain representation of the acoustic emissions with calibration data obtained during pre-use testing of the acoustic wave generator.

\* \* \* \* \*